April 10, 1951      R. E. GILL      2,548,153
CHANGE-SPEED TRANSMISSION
Filed Oct. 28, 1948      2 Sheets-Sheet 1
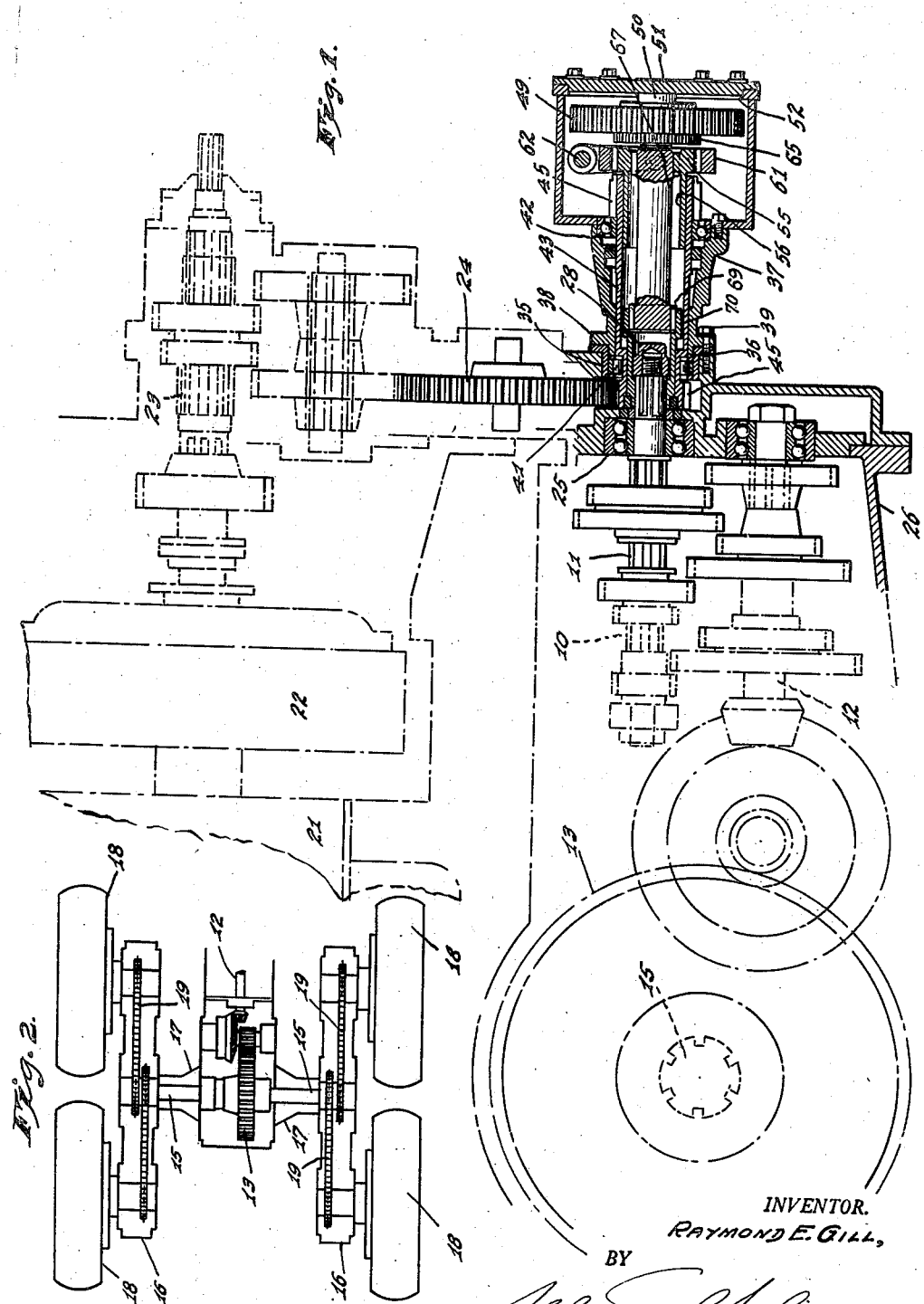
INVENTOR.
RAYMOND E. GILL,
BY
ATTORNEYS.

April 10, 1951
R. E. GILL
2,548,153
CHANGE-SPEED TRANSMISSION
Filed Oct. 28, 1948
2 Sheets-Sheet 2
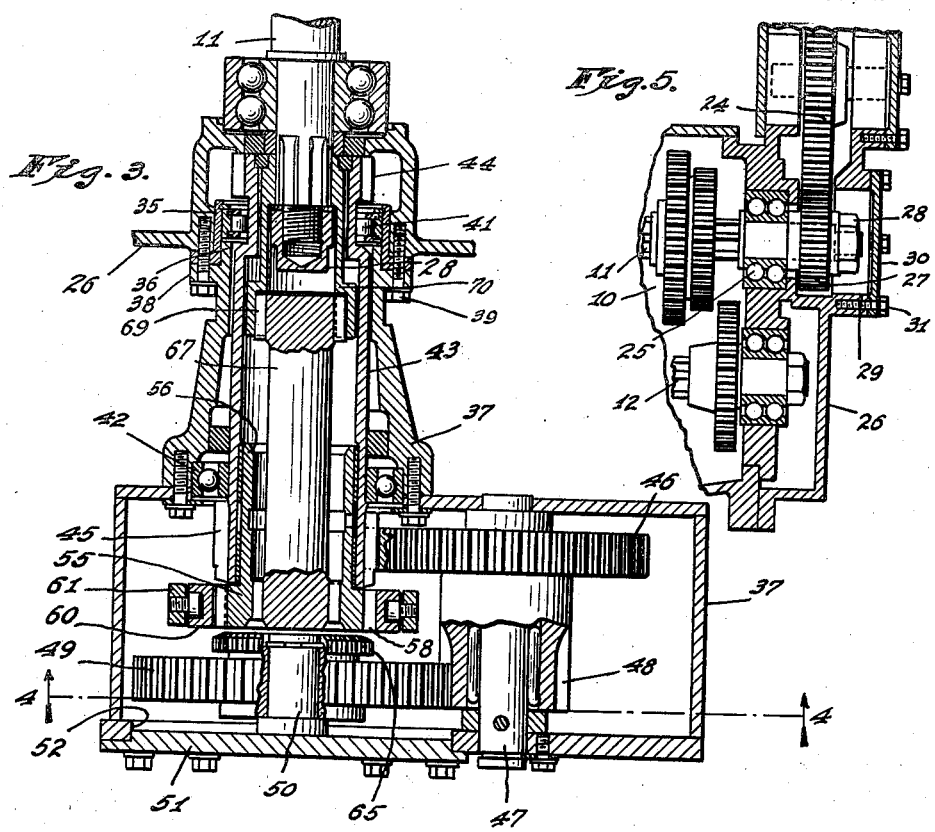
Fig. 3.
Fig. 5.
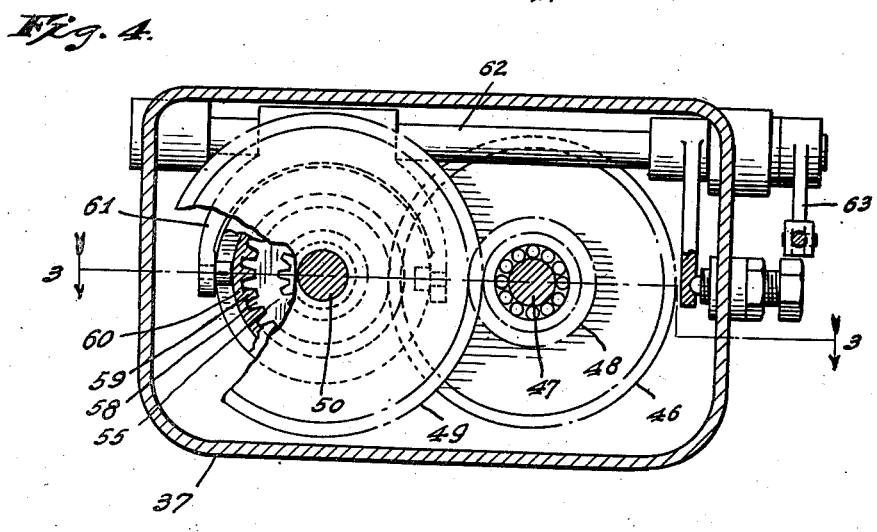
Fig. 4.
INVENTOR.
RAYMOND E. GILL,
BY
ATTORNEYS.

Patented Apr. 10, 1951

2,548,153

UNITED STATES PATENT OFFICE 2,548,153

CHANGE-SPEED TRANSMISSION

Raymond E. Gill, Indianapolis, Ind., assignor to J. D. Adams Manufacturing Co., Indianapolis, Ind., a corporation of Indiana Application October 28, 1948, Serial No. 57,106

4 Claims. (Cl. 74—745)

This invention relates to automotive vehicles and more particularly to an auxiliary power transmission mechanism which can be used in association with the regular change-speed transmission mechanism incorporated in the vehicle to augment the range of drive-ratios available. One form of vehicle in connection with which my invention is adapted for use is the machine shown in my co-pending application Serial No. 57,105, filed October 28, 1948. The machine to which that application is directed is a more or less conventional form of automotive road grader converted for use as a rotary snow plow. In the operation of such a machine, it sometimes happens that the snow to be removed is so deep that the rotary snow plow cannot dispose of it at a rate great enough to permit operation of the vehicle at even the lowest speed attainable with the regular change-speed drive mechanism. It is therefore desirable to equip the regular change-speed transmission mechanism with an auxiliary transmission mechanism capable of providing lower vehicle speeds.

It is the object of my invention to produce for incorporation in an automotive vehicle an auxiliary transmission mechanism which can be readily applied to a conventional form of change-speed power transmission mechanism to extend the range of drive ratios attainable. A further object of the invention is to provide an auxiliary transmission mechanism which can be simply and economically manufactured and which can be installed with a minimum of alteration.

One common form of change-speed transmission mechanism used in vehicles of the type to which my invention is adapted embodies a primary or driving shaft driven through a pinion rigidly mounted on one end of it, such pinion being located outwardly beyond the shaft bearing and in alignment with an opening in the adjacent wall of the transmission housing. My invention contemplates the removal of the conventional closure for the opening just referred to, the removal of the pinion, and the application of an auxiliary transmission including a sleeve rigidly connected to the transmission shaft, a pinion rotatable on said sleeve and of the same diameter as the conventional pinion which is replaced, and gearing for interconnecting the sleeve and its associated pinion at any of a plurality of different speed ratios. The auxiliary transmission is enclosed in a housing which is secured to the main transmission housing over the opening previously referred to.

The accompanying drawings illustrate my invention:

Fig. 1 is a fragmental side elevation illustrating my auxiliary transmission applied to the main transmission of an automotive vehicle, most of such main transmission mechanism being indicated in chain lines; Fig. 2 is a diagrammatic plan view illustrating a portion of the conventional drive mechanism of the automotive vehicle; Fig. 3 is a horizontal section on the line 3—3 of Fig. 4 illustrating the details of the auxiliary transmission; Fig. 4 is a vertical section on the line 4—4 of Fig. 3; and Fig. 5 is a fragmental section similar to Fig. 1 illustrating the conventional form of transmission mechanism as unmodified by incorporation of my invention.

In Fig. 1, I have shown a more or less conventional form of change-speed transmission mechanism 10 of the sliding-gear type, such transmission mechanism including a drive shaft 11 and a driven shaft 12. The driven shaft 12 is shown as operatively connected to a ring gear 13 which is in turn connected with axle shafts 15 of a tandem drive unit. The latter comprises hollow beams 16 pivotally mounted on axle carriers 17 concentric with the shafts 15 and carrying at their ends drive wheels 18 which are connected with the axle shafts 15 through chain drives 19. It will be understood, however, that the precise form of vehicle drive illustrated is shown merely by way of example and forms no part of my invention.

In the vehicle shown in the drawings, it is contemplated that an engine 21 will be located above the drive unit and operatively connected to the transmission 10 through a releasable clutch 22, an overdrive gear-set 23, and an idler gear 24, the latter normally meshing with a pinion rigidly secured to one end of the transmission driveshaft 11 outwardly beyond a bearing 25 through which said shaft is supported in a transmission housing 26. The normal arrangement is illustrated in Fig. 5, which shows a pinion 27 splined to the end of the drive shaft 11 and held thereon by a nut 28 in position to engage the gear 24. To permit access to the pinion 27 and the nut 28, for purposes of inspection, replacement, or repair, the transmission housing 26 is provided with an opening normally covered by a closure 30 held in place as by screws 31. Application of my auxiliary transmission to the parts shown in Fig. 5 involves removal of the cover 30, the nut 28, and the pinion 27, and their replacement by the parts now to be described.

My auxiliary transmission is supported in alignment with the shaft 11 of the main transmission, conveniently being located in such position by engagement with the wall of the opening 29 in the transmission housing. If that opening is not accurately concentric with the shaft 11, it may be made so by securing to the end of such shaft an appropriate boring bar, and rotating the shaft 11 while the boring bar is operated to machine the surface of the opening 29. The auxiliary transmission is desirably located from the opening 29 by a flanged bushing 35 which is received in such opening and which in turn receives a machined boss 36 on an auxiliary-transmission housing 37. Adjacent such boss, the housing 37 has an outwardly extending annular flange 38 which overlies the flange on the bushing 35; and the bushing flange and the flange 38 are provided with aligned openings for the reception of screws 39 receivable in the same screw-threaded openings as the screws 31 normally employed to hold the closure 30 in place.

An anti-friction bearing 41 mounted within the bushing 35 and a second anti-friction bearing 42 mounted within the housing 37 provide rotatable support for a hollow sleeve 43 which extends into the transmission housing 26 and which is provided at its end with an annular series of gear teeth 44 adapted to replace the conventional pinion 27 in engagement with the idler gear 24. Beyond the anti-friction bearing 42, the sleeve 43 is provided with a second annular series of gear teeth 45 meshing with a gear 46 rotatably supported within the housing 37 on a shaft 47. The gear 46 has rigid with it a pinion 48 meshing with a gear 49 which is supported for rotation about an axis coincident with that of the sleeve 43. Conveniently, the gear 49 is mounted on a stationary stub shaft 50 projecting inwardly of the housing 37 from a plate 51 which covers an opening 52 in the wall of the housing 37. The opening 52 is of course large enough to permit passage of the gear 49, so that the gear can be assembled on to the shaft 50 and the gear and cover 51 positioned as a unit.

Rotatably supported between the gear 49 and the adjacent end of the sleeve 43 is a clutch member 55. Conveniently, such clutch member has a hub 56 of considerable axial extent which is rotatably received within the sleeve 43. The clutch member 55 also has an external annular series of clutch teeth 58 which mesh with an internal annular series of teeth 59 provided on an outer clutch member 60 concentric with the clutch member 55. The outer clutch member 60 is adapted for axial movement under the control of a shifter fork 61 rigidly mounted on a rock shaft 62 which extends through one wall of the housing 37 and is provided at its outer end with an arm 63 through which it can be rocked to position the clutch member 60 in a normal position co-planar with the clutch member 55 or displaced in either axial direction from such normal position.

The gear teeth 45 on the sleeve 43 project outwardly beyond the gear 46, and their projecting portions, at least, are adapted to enter the spaces between the teeth 59 on the outer clutch member 60 so that the outer clutch member can be moved into a position such that it overlaps both the clutch member 55 and the teeth 45 and serves to provide a direct driving connection between the clutch member 55 and the sleeve 43. The hub of the gear 49 is provided with a series of external teeth 65 also adapted to enter between the teeth 58 on the outer clutch member 60, so that by moving the outer clutch member in the opposite direction it can be brought into overlapping relation with the teeth 65 and the inner clutch member 55 to connect the gear 49 to the clutch member 55.

The clutch member 55 is adapted for connection to the drive shaft 11 of the main transmission. To this end, the clutch member 55 may be provided with an internal series of clutch teeth adapted to mesh with a complementary series of teeth on one end of a shaft 67 which extends through the sleeve 43 to a point adjacent the end of the shaft 11, where it is provided with a second annular series of external clutch teeth 69. A coupling sleeve 70, splined at one end to receive the splined end of the shaft member, is provided at the other end with a series of internal teeth meshing with the teeth 69 on the shaft 67. The coupling sleeve 70 is conveniently held in place on the end of the shaft 11 by the same nut 28 which is normally employed to hold the pinion in place.

In installing my transmission, the cover plate or closure 30 and the pinion 27 of the regular transmission are removed. In the auxiliary transmission, the cover 51 with the gear 49 mounted thereon is removed as is also the shaft 67, which is withdrawable outwardly from its position within the sleeve 43. The auxiliary transmission, with the bushing 35 in place thereon, is then applied to the transmission housing 26 and the screws 39 are inserted and tightened. The nut 28 is inserted through the opening 52 and sleeve 43 and tightened on the threaded end of the transmission shaft 11 to secure the coupling 70 thereto. Following this, the shaft 67 is inserted and engaged with the coupling member 70 and inner clutch member 55, and the cover 51 is secured in place on the housing of the auxiliary transmission. The auxiliary transmission is now ready for operation.

With the outer clutch member 60 in the neutral position shown in the drawings, the auxiliary transmission is inoperative to provide for the transmission of power from the idler gear 24 to the shaft 11 of the main transmission. If it is not desired to employ the augmented range of drive-ratios provided by the auxiliary transmission, the shaft 62 is rocked to move the clutch member 60 into a position in which it overlaps both the clutch member 55 and the teeth 45 on the end of the sleeve 43. In this condition, the internal teeth on the clutch member 60 provide a direct connection between the teeth 45 on the sleeve 43 and the inner clutch member 55, which is connected through the shaft 67 and coupling member 70 to the drive shaft 11 of the transmission. If it is desired to take advantage of the drive-ratios which the auxiliary transmission provides, the rock shaft 62 is rocked to move the outer clutch member 60 into overlapping relationship with the inner clutch member 55 and the teeth 65 of the gear 49. In this condition, the teeth 45 on the sleeve 43 drive the gear 46; and the pinion 48, rigid with such gear, drives the gear 49 to provide a reduced-speed drive ratio.

I claim as my invention:

1. In combination with a change-speed transmission mechanism having a housing provided with an opening in one wall, a shaft rotatably mounted within said housing in alignment with said opening, a gear adapted normally to mesh with a pinion on said shaft, and means for operatively connecting said gear to a source of power; an auxiliary transmission having a casing secured to said housing at said opening, a sleeve rotatably supported within said casing and extending into said housing in alignment with said shaft, said sleeve having an exterior annular series of gear teeth meshing with said gear, a second shaft rotatable relatively to said sleeve and disposed coaxially therewithin, means removably coupling said second shaft to the first named shaft, and power-transmission means located within said casing for interconnecting said sleeve and second shaft at any of a plurality of different speed ratios.

2. The invention set forth in claim 1 with the addition that said coupling means comprises a coupling member secured to said first shaft and provided with a coaxial series of internal clutch teeth, said power transmission means including a clutch member rotatably supported from and coaxial with said sleeve and having a coaxial series of internal clutch teeth, said second shaft being provided at its ends with annular series of external clutch teeth complementary to and meshing with the internal clutch teeth on said coupling member and clutch member.

3. The invention set forth in claim 1 with the addition that the power transmission means in said casing comprises a gear rotatably supported within the casing coaxially with said sleeve and second shaft, gearing interconnecting said sleeve and said last named gear, and clutch means for alternatively connecting either said sleeve or said last named gear to said second shaft.

4. The invention set forth in claim 3 with the addition that the casing is provided in alignment with said sleeve with an opening larger than said last named gear, said opening being provided with a removable closure, said last named gear being rotatably mounted on said closure.

RAYMOND E. GILL.

REFERENCES CITED

The following references are of record in the file of this patent:

UNITED STATES PATENTS

| Number | Name | Date |
|---|---|---|
| 1,961,809 | Wood | June 5, 1934 |
| 2,034,141 | Gustafson | Mar. 17, 1936 |
| 2,245,078 | Padgett | June 10, 1941 |
| 2,306,902 | Rabe | Dec. 29, 1942 |
| 2,323,404 | Kuchar | July 6, 1943 |

FOREIGN PATENTS

| Number | Country | Date |
|---|---|---|
| 522,260 | Great Britain | June 13, 1940 |